Patented June 13, 1950

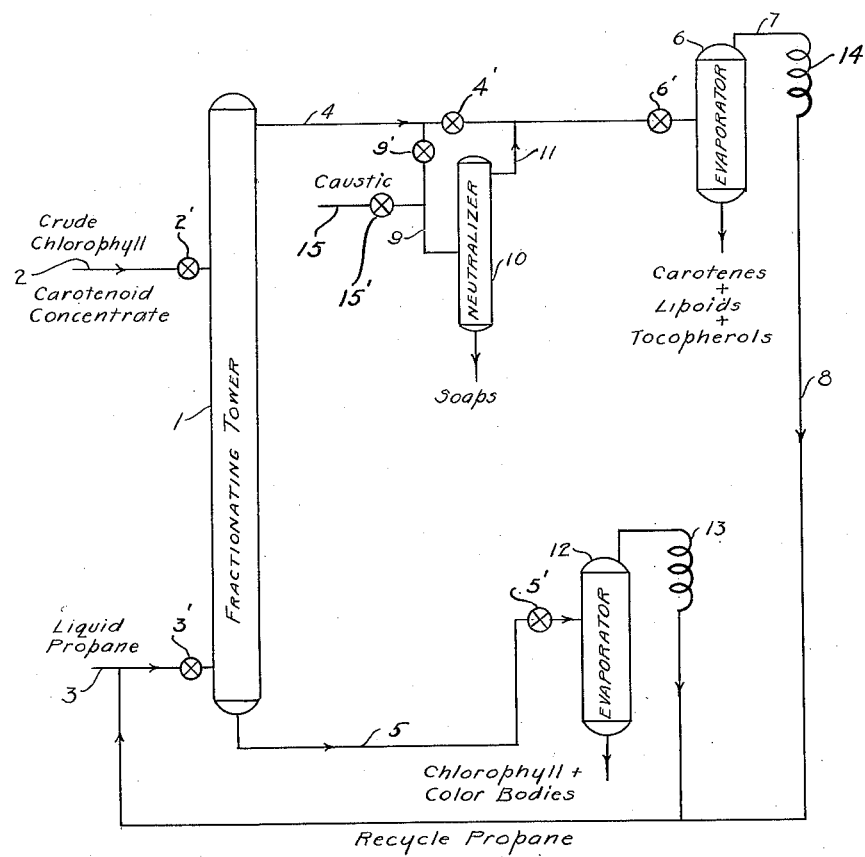

2,511,824

UNITED STATES PATENT OFFICE 2,511,824

FRACTIONATION OF PLANT PIGMENTS

Ralph Miller, Woodside, N. Y., assignor to The Chemical Foundation, Incorporated, a membership corporation of New York Application April 29, 1947, Serial No. 744,795

14 Claims. (Cl. 260—314)

This invention is concerned with the fractionation of plant pigments with special emphasis on the separation of carotene from chlorophyll.

It is known that plants live and grow through the biological process known as photosynthesis. This process is intimately associated with chlorophyll, a green material of complex structure found in all living green plants. Invariably, this plant pigment is accompanied by other plant pigments including carotene and xanthophyll. Carotene can be converted into vitamin A in the body of man and many other animals and hence is of importance in human and animal nutrition.

Carotene, chlorophyll and other plant pigments contained in plants are not markedly stable under ordinary conditions so that they tend to be destroyed if the plants in which they are contained are stored for any length of time. For certain uses, concentrates of carotene and chlorophyll are required which necessitate their isolation from the plant material in which they are found. For these reasons plants containing these constituents are treated to remove and recover them in a relatively pure and concentrated form.

Ordinarily, plants from which pigments are extracted are dried and ground prior to being contacted with a solvent for the pigments. Many types of solvents can be used, such as hydrocarbons, ketones, chlorinated hydrocarbons and the like.

In addition to the substances mentioned above, plants contain other constituents which are soluble in these solvents, such as lipids. The solvent and plant material are contacted under conditions favorable to the solution of the extractable constituents in the solvent. The solvent solution is then separated from the insoluble residue by settling, filtration, centrifuging or any other suitable means. The extract solution is then usually concentrated by removing part or all of the solvent by distillation. This procedure results in the production of a crude concentrate which requires additional treatment to produce marketable carotene concentrates and marketable chlorophyll-containing mixtures. Crude concentrates such as these are complex because they are made up of the total fat soluble constituents of a living organism and even simple living organisms contain a large number of compounds. Any physical method of separating them is complicated because the action of the separating agent on any particular constituent of the mixture is affected by some or all of the other constituents in the mixture. This means that to obtain a clear cut, efficient (from the yield standpoint) separation of any two constituents of the mixture it is advantageous that each fraction be subjected to the separating agency repeatedly.

The fact that extracts from living organisms such as those from plant tissue are mixtures of many compounds each of which influences the behavior of the other constituents, has prevented the successful development of any simple method of separating chlorophyll from carotene using selective solvents although much work has been carried out in an effort to accomplish this objective.

Substantially all proposed methods of separating carotene from chlorophyll have used either saponification or adsorption or a combination of these two unit processes. These processes are time consuming and expensive. They require the consumption of reagents and are ill-adapted to continuous operation. Consequently, they involve constant supervision of well trained personnel. In addition, they tend to destroy some of the useful constituents found in the plant extracts.

It is a principal objective of this invention to separate mixtures containing carotene and chlorophyll into fractions in which each of these constituents are concentrated without consuming any reagents and under conditions which preclude any appreciable decomposition of these substances.

A second objective of this invention is to produce a carotene concentrate which possesses the typical color of a carotene preparation, not brown or black, and to accomplish this without consuming any reagents.

A third objective of this invention is the production of a carotene concentrate of enhanced stability compared with carotene concentrates prepared by methods known previously.

A fourth objective of this invention is to provide an economical method by which the repetitive treatment mentioned above of each phase containing either the carotene or the chlorophyll can be accomplished.

Another advantage of this invention is that it effectively separates the fatty acids and fats in the crude concentrate from the chlorophyll. The cost of separating chlorophyll from carotene by direct adsorption is too high to be employed on an industrial scale. Consequently, saponification is practically universally employed. When the plant extract is treated by alkali, not only is the chlorophyll saponified but the fat and fatty acids are saponified as well. The carotene is unaffected which permits the carotene to be separated from the saponified constituents. As a result of this operation, the chlorophyll in the saponified form is mixed with the soaps formed from the fats and fatty acids. This complicates the recovery of chlorophyll or chlorophyll derivatives from the mixture of saponified materials. In the present process the chlorophyll is not only separated from the carotene but it is also separated from the lipids, thus simplifying the recovery and refining of chlorophyll and its derivatives. In order to more clearly explain the invention, the process is illustrated in flow sheet form in the accompanying drawing.

It is known that the solubility of pure carotene in paraffin hydrocarbons at relatively low temperatures is small. Similarly, the solubility of pure chlorophyll in paraffin hydrocarbons is very low. However, in the presence of each other and the large amount of lipoidal matter in plant tissue, paraffin hydrocarbons readily dissolve chlorophyll and carotene along with the other "fat soluble" constituents of plant tissue. In fact, as stated above, paraffin hydrocarbons are employed to extract the "fat soluble" constituents from plants.

Although paraffin hydrocarbons can be used to produce crude chlorophyll-carotene-containing concentrates, I have discovered that liquefied, normally gaseous, paraffinic hydrocarbons such as propane, butane, isobutane or suitable mixtures of ethane and propane and mixtures of similar solvent characteristics, permit such crude concentrates to be separated into fractions one of which is more concentrated with respect to chlorophyll than the original mixture and the other is more concentrated with respect to carotene than the original mixture.

The preferred solvent is propane. When a crude chlorophyll-carotene containing concentrate is treated with sufficient liquefied propane at a temperature of about 160° F. and a pressure sufficiently high to maintain the propane in the liquid state, two immiscible, liquid phases are formed. The lighter phase is composed primarily of propane plus some of the lipoidal matter; the denser phase contains most of the black and brown color bodies, substantially all the chlorophyll and the remainder of the lipoidal matter. Some of the carotene is in the propane phase and some in the chlorophyll phase. The two phases are easily separated. After this is done, the propane in the lighter phase is readily removed and recovered by distillation. The residue consists of the lipoidal matter originally in the lighter phase plus the carotene present in that phase. It is lighter in color than the charge material and substantially free from chlorophyll. The denser phase containing practically all the chlorophyll and the remainder of the lipoidal matter and carotene may be treated again in the same way with another portion of propane to recover an additional quantity of chlorophyll-free carotene. This procedure can be repeated until practically all the carotene is freed from chlorophyll. Such a method of procedure, while feasible, is neither as efficient nor as practical as a continuous method of treating crude concentrate with liquefied, normally gaseous hydrocarbons or mixtures thereof. The preferred method of effecting this separation by means of liquefied, normally gaseous hydrocarbons as exemplified by propane, is to use a continuous liquid-liquid extraction system suitable for use with liquid propane at elevated temperatures and pressures. A tower adapted for liquid-liquid extraction under the specified conditions and equipped with means for heating the tower contents at various locations is the preferred type of contacting equipment. The mixture containing the carotene and chlorophyll is pumped into the tower close to its top. Liquid propane is pumped into the tower at a lower level. The temperature is maintained above about 160° F. at the top of the tower. A somewhat lower temperature may prevail near the base of the tower. The mixture of chlorophyll and carotene flows down the tower and meets a rising stream of liquefied hydrocarbon. Under the conditions that exist in the tower, two immiscible liquid phases are present. The propane phase is less dense than the chlorophyll containing phase and therefore it rises while the chlorophyll containing phase flows downward. As the two phases flow past each other they are brought into intimate contact by means of the packing or baffles in the tower. The carotene under the conditions existing in the tower passes from the chlorophyll containing phase to the propane phase but under the same conditions substantially none of the clorophyll will dissolve in the propane phase. Most of the lipids present in the feed to the tower also pass into the propane phase. The propane phase under the conditions prevailing in the tower does not dissolve any appreciable amount of the brown or black colored bodies in the feed. A suitable ratio of selective solvent to crude concentrate depends upon the type of plant from which the concentrate was prepared, the prior history of the plant and similar considerations. In general, from 10 to 40 parts by weight or more of solvent to crude concentrate are used.

The propane phase leaves the tower at its top and is then pumped to solvent recovery equipment in which the propane is removed, recovered, and recycled to the extraction operation. The propane free residue is usually dark red in color due to its carotene content. If any free fatty acids are present in the crude concentrate, they will accompany the carotene. It is convenient to remove them from the propane solution by continuously contacting the propane solution flowing from the top of the extraction tower with alkali to react with the fatty acids to form a soap insoluble in the propane solution and continuously separating the soap from the propane solution before the propane solution flows into the solvent recovery equipment.

It will be appreciated that this method of separating the fatty acids involves essentially simple neutralization effected in the absence of oxygen and in a relatively brief period. Hence, this type of treatment differs materially from the usual method of saponification which involves the relatively long period of contact between the alkali and triglycerides to form a soap and glycerine.

The chlorophyll-containing phase flows out of the bottom of the extraction tower. A small amount of solvent accompanies it. This solvent is removed, recovered and recycled in the conventional manner. The residue contains the chlorophyll, the brown and black color bodies and any solid extraneous substances which were present in the crude concentrate. The values contained in the chlorophyll concentrate may be worked up by known methods or may be used as such where the dark color is not objectionable.

It is known that tocopherols are antioxidants for carotene preparations and that they are usually present in the lipoidal matter of green plants. The tocopherols present in the crude concentrate charged to the extraction tower accompany the carotene into the propane phase and are substantially completely recovered in the carotene concentrate. As a result of this discovery that both the carotene and the tocopherols accompany the propane phase while the chlorophyll remains substantially insoluble in it under the conditions existing in the tower, it is possible to produce carotene concentrates which are more stable than those formed by means of a saponification process as tocopherols are readily destroyed under the conditions which usually prevail during ordinary methods of saponification.

Such an improved process may be carried out in a suitable plant such as that illustrated in the drawing. In operation the mixture containing the carotene and chlorophyll is continuously charged to the upper portion of the tower 1 through the line 2 and in amounts controlled by valve 2'. Liquid propane is continuously pumped into the tower near the base through line 3 and in amounts controlled by valve 3'. As explained, during the continuous operation the solvent phase passed out of the tower near the top through the line 4 while the more dense phase containing the chlorophyll and color bodies pass out of the base of the tower through line 5.

The upper carotene-enriched phase, as explained, may be passed directly to evaporator 6 through the pressure reduction valve 6'. In the evaporator under the reduced pressure conditions the propane is evaporated and is condensed in condenser 14. The condensed propane may be recycled through line 8 to the propane charge line 5. During this passage the propane may be compressed by suitable compressors not shown.

If the propane phase withdrawn from the top of the tower contains free fatty acids they may readily be removed. For this purpose as shown, the valve 6' is closed and the valve 9' in line 9 is open thus passing the upper phase through the neutralizer 10. A suitable alkali such as caustic is fed into the stream flowing to the neutralizer through the line 15. The amount of caustic sufficient to neutralize the fatty acids is readily controlled by regulating the valve 15'. The insoluble soaps formed in the neutralizer settle to the base and are withdrawn through a suitably valved line. The soap-free solvent with its dissolved components passes through line 11 and valve 6' and is treated as previously described to separate the solvent from the dissolved fractions. The separated carotenes-lipoids and tocopherols as shown, are continuously withdrawn from the base of evaporator 6.

The more dense chlorophyll-containing phase, as explained, is withdrawn from the bottom of the tower through line 5. As shown this passes continuously through the pressure reduction valve 5' to the evaporator 12. In this unit the solvent is evaporated under the reduced pressure, is condensed in condenser 13 and after whatever necessary recompression is recycled to the tower for re-employment in the process. As shown the chlorophyll-color bodies fraction is withdrawn from the base of the tower and may be treated in any desired manner or used as such where the dark color is not objectionable.

It is to be noted that not only does this method of treating a crude mixture of chlorophyll and carotene effect a separation of these two constituents but it also possesses the twin advantage of keeping the carotene and tocopherols together in substantially the same ratio as they are present in the crude concentrate and simultaneously producing a carotene concentrate which is substantially free from the objectionable, dark, color bodies whose complex constitution is not known.

While a preferred procedure for effecting the fractionation of crude carotene-chlorophyll-containing mixtures has been described, it is to be understood that this is given to illustrate the novel concept of invoking the specific differential solubility of carotene and chlorophyll in the described special class of solvents, namely, liquefied, normally gaseous hydrocarbons.

I claim:

1. The process of fractionating a crude chlorophyll-carotene-containing mixture into fractions one of which contains a greater ratio of carotene to chlorophyll than that in the original mixture and the other a ratio of chlorophyll to carotene that is larger than that in the original mixture which comprises, contacting the mixture with liquid propane at a temperature of about 160° F. and a pressure sufficiently high to maintain the propane in the liquid phase to form two, separable, immiscible liquid phases, the less dense phase containing a ratio of carotene to chlorophyll greater than the original mixture and the denser phase a ratio of chlorophyll to carotene greater than the original mixture, and separating the two phases.

2. A process for separating a crude chlorophyll-carotene-containing mixture into fractions one of which contains a greater ratio of carotene to chlorophyll than that in the original mixture and the other a ratio of chlorophyll to carotene that is larger than that in the original mixture, the steps which comprise, contacting such mixture with liquid propane in a continuous liquid-liquid extraction system at a temperature above about 160° F. and a pressure sufficiently high to maintain the propane in the liquid phase, continuously withdrawing from said system one liquid phase consisting primarily of propane in which the ratio of carotene to chlorophyll is greater than the ratio in the original mixture and a second liquid phase containing a ratio of chlorophyll to carotene substantially greater than the ratio in the initial mixture.

3. The process of separating an extract of plant tissue containing lipids, chlorophyll, carotene and tocopherols into two fractions one of which contains substantially all the lipids, carotene and tocopherols and the other substantially all the chlorophyll which comprises, contacting such extract with liquid propane in a continuous liquid-liquid extraction system at a temperature above about 160° F. and a pressure sufficiently high to maintain the propane in the liquid phase, continuously withdrawing from said system one liquid phase containing substantially all the carotene, lipids, and tocopherols and most of the propane and a second liquid phase containing substantially all the chlorophyll and the remainder of the propane.

4. A process of treating the crude extract from plant tissue containing chlorophyll, carotene and other fat soluble constituents of the plant tissue and recovering a carotene fraction and a chlorophyll fraction therefrom which comprises, passing said extract to the upper section of a continuous counter-current extraction zone, passing liquid propane into the lower section of said zone, maintaining within said zone a temperature of substantially 160° F. continuously withdrawing from the upper portion of the zone a liquid fraction consisting of propane in which substantially all the carotene is dissolved and continuously withdrawing from the lower end of the zone a liquid phase containing substantially all the chlorophyll and some dissolved propane.

5. The process of separating an extract of plant tissue containing lipids, chlorophyll, carotene, tocopherols and fatty acids into two fractions one of which contains substantially all of the carotenes, lipids, tocopherols and fatty acids and the other substantially all of the chlorophyll in the said extract which comprises, contacting such extract with a liquefied, normally gaseous paraffinic hydrocarbon in a continuous liquid-liquid extraction system at a pressure sufficiently high to maintain the hydrocarbon in liquid phase and at a temperature sufficiently elevated to insure the formation of two immiscible liquid phases of different densities; withdrawing from the system the denser liquid phase containing substantially all of the chlorophyll and the less dense liquid phase containing substantially all of the carotene, lipids, tocopherols and fatty acids and most of the hydrocarbon, contacting such withdrawn less dense liquid phase with an alkali to convert the fatty acids to soaps insoluble in the hydrocarbon, separating the soaps, and removing the hydrocarbon to recover a concentrate enriched in carotene, lipids and tocopherols.

6. The process of separating an extract of plant tissue containing carotene and chlorophyll into two fractions one of which contains substantially all the carotene and the other substantially all the chlorophyll which comprises, continuously passing said extract into a continuous counter-current extraction system close to one end of said system and continuously passing propane into said continuous counter-current extraction system close to the other end, at a pressure sufficiently high to maintain the propane in liquid phase and at a temperature sufficiently elevated to insure the formation of two immiscible, separable, liquid phases; continuously withdrawing from the said system one liquid phase containing substantially all of the carotene and most of the propane; and withdrawing from the said system the other liquid phase containing substantially all the chlorophyll and the remainder of the propane.

7. A process of fractionating a crude chlorophyll-carotene-containing mixture into fractions one of which has a greater ratio of carotene to chlorophyll than the original mixture and the other a ratio of chlorophyll to carotene that is greater than that in the original mixture which comprises, contacting the mixture with a liquefied, normally gaseous paraffinic hydrocarbon at a pressure sufficiently high to maintain the hydrocarbon in liquid phase and at a temperature sufficiently elevated to insure the formation of two, separable immiscible liquid phases of different densities, the less dense phase containing a ratio of carotene to chlorophyll greater than that in the original mixture and the denser phase a ratio of chlorophyll to carotene greater than that in the original mixture, and separating the two phases.

8. A process of separating a crude chlorophyll-carotene-containing mixture into fractions one of which contains a greater ratio of carotene to chlorophyll than that in the original mixture and the other a ratio of chlorophyll to carotene greater than that in the original mixture which comprises, contacting said mixture with a liquefied, normally gaseous paraffinic hydrocarbon in a continuous liquid-liquid extraction system at a pressure sufficiently high to maintain the hydrocarbon in the liquid phase and at a temperature sufficiently elevated to insure the formation of two immiscible liquid phases of different densities, continuously withdrawing from the system the less dense phase consisting primarily of the liquefied hydrocarbon in which the ratio of carotene to chlorophyll is greater than the ratio in the original mixture and continuously withdrawing the denser liquid phase containing a ratio of chlorophyll to carotene substantially greater than such ratio in the initial mixture.

9. A process of separating an extract of plant tissue containing lipids, chlorophyll, carotene and tocopherols into two fractions one of which contains substantially all of the lipids, carotene and tocopherols and the other substantially all of the chlorophyll which comprises, contacting such extract with a liquefied, normally gaseous paraffinic hydrocarbon in a continuous liquid-liquid extraction system at a pressure sufficiently high to maintain the hydrocarbon in the liquid phase and at a temperature sufficiently elevated to insure the formation of two immiscible liquid phases of different densities, withdrawing from the system the lighter liquid phase containing substantially all the carotene, lipids and tocopherols with most of the hydrocarbon and a second liquid phase containing substantially all of the chlorophyll and the remainder of the hydrocarbon.

10. A process of treating the crude extract of plant tissue containing chlorophyll and carotene to recover a carotene enriched and a chlorophyll enriched fraction which comprises, passing said extract to the upper portion of a continuous counter-current extraction zone, counter-currently passing a liquefied, normally gaseous paraffinic hydrocarbon into the lower section of the zone, maintaining the hydrocarbon at a temperature sufficiently elevated to insure the formation of two immiscible liquid phases of different densities, continuously withdrawing from the upper section of the zone the less dense phase in which the carotene is largely concentrated, continuously withdrawing from the lower portion of the zone the denser liquid phase containing substantially all of the chlorophyll, removing the hydrocarbon from each phase to recover respectively a carotene enriched fraction and a chlorophyll enriched fraction and recycling the hydrocarbon separated from each of these to the said extraction zone.

11. A process in accordance with claim 5 comprising removing the hydrocarbon from the separated, less dense liquid phase to recover a carotene-enriched fraction.

12. A process in accordance with claim 5 comprising removing the hydrocarbon from the separated denser liquid phase to recover a concentrate enriched in chlorophyll.

13. A process in accordance with claim 8 comprising removing the hydrocarbon from the said less dense phase to recover a carotene-enriched fraction.

14. A process in accordance with claim 8 comprising removing the hydrocarbon from the denser liquid phase to recover a fraction enriched in chlorophyll.

RALPH MILLER.

REFERENCES CITED

The following references are of record in the file of this patent:

UNITED STATES PATENTS

| Number | Name | Date |
|---|---|---|
| 2,118,454 | Schaafsma | May 24, 1938 |
| 2,131,394 | Test | Sept. 27, 1938 |
| 2,394,278 | Wall et al. | Feb. 5, 1946 |
| 2,394,968 | Van Orden | Feb. 12, 1946 |